United States Patent [19]

Suzuki et al.

[11] Patent Number: 5,270,928
[45] Date of Patent: Dec. 14, 1993

[54] TRANSLATION MACHINE THAT INHABITS TRANSLATION OF SELECTED PORTIONS OF A SENTENCE USING STORED NON-TRANSLATION RULES

[75] Inventors: Hitoshi Suzuki, Nara; Yoji Fukumochi, Ikoma; Shuzo Kugimiya; Ichiko Sata, both of Nara; Tokuyuki Hirai, Yamato-Koriyama, all of Japan

[73] Assignee: Sharp Kabushiki Kaisha, Osaka, Japan

[21] Appl. No.: 644,333

[22] Filed: Jan. 23, 1991

[30] Foreign Application Priority Data

Jan. 26, 1990 [JP] Japan .................. 2-17115

[51] Int. Cl.⁵ ........................................... G06F 15/40
[52] U.S. Cl. ........................................... 364/419.05
[58] Field of Search ............... 364/419, 900, DIG. 2

[56] References Cited

U.S. PATENT DOCUMENTS

| | | | |
|---|---|---|---|
| 4,814,988 | 3/1989 | Shiotani et al. | 364/419 |
| 4,833,611 | 5/1989 | Fukumochi et al. | 364/419 |
| 5,005,127 | 2/1991 | Kugimiya et al. | 364/419 |
| 5,010,486 | 4/1991 | Suzuki et al. | 364/419 |
| 5,088,039 | 2/1992 | Kugimiya et al. | 364/419 |

FOREIGN PATENT DOCUMENTS

| | | |
|---|---|---|
| 0180888A2 | 5/1986 | European Pat. Off. . |
| 0201096A2 | 11/1986 | European Pat. Off. . |
| 2193355 | 2/1988 | United Kingdom . |
| 2193362 | 2/1988 | United Kingdom . |
| 2199170 | 6/1988 | United Kingdom . |
| 2234614 | 2/1991 | United Kingdom . |

Primary Examiner—Roy N. Envall, Jr.
Assistant Examiner—Andrew Bodendorf
Attorney, Agent, or Firm—Nixon & Vanderhye

[57] ABSTRACT

A translation machine capable of analyzing a syntax of a sentence described in a source language, converting the syntax in the source language into a syntax in a target language so that a translated sentence is generated in accordance with the syntax in the target language includes a unit for storing an information of predetermined rules of a non translation, a unit connected to the storing unit for controlling a translation of the sentence described in the source language so that a part of the sentence structured on a predetermined grammer rule is inhibited to be translated, and a unit connected to the controlling unit for outputting the part of the sentence which is inhibited of the translation.

9 Claims, 4 Drawing Sheets

TRANSLATION MACHINE THAT INHABITS TRANSLATION OF SELECTED PORTIONS OF A SENTENCE USING STORED NON-TRANSLATION RULES

BACKGROUND OF THE INVENTION

1. Field of the Invention

The present invention relates to a translation machine which is capable of performing syntax analysis, syntax conversion, and sentence generation in translating a sentence described in a source-language into a sentence described in a target-language. More particularly, the invention relates to the translation machine which is capable of outputting a specific portion of the sentence described in the source-language without being translated.

2. Description of the Related Art

The inventors of the present invention know that the known translation machine has been designed to analyze a syntax of an input sentence by referring dictionaries and grammar rules, to convert it into a target-language syntax, and to generate a translated equivalent on a basis of the target-language syntax for the purpose of outputting a translated sentence.

However, the above-mentioned translation machine translates all the words into target-language when it outputs a final translated sentence. When the sentence described in the source-language has a technical term dedicated for a special field, it results in impairing the translated sentence, because the translated technical term often makes he overall sentence obscure.

In considering a compound noun phrase "gearbox module", the above-mentioned translation machine works to divide the compound noun phrase "gearbox module", which is functioned as a technical phrase, into two nouns "gearbox" and "module" and to translate each word into a target-language equivalent. It results in making the output sentence obscure.

SUMMARY OF THE INVENTION

It is therefore an object of the present invention to provide a translation machine which is capable of outputting a specific portion of a sentence described in a source-language as its translated portion without being translated.

The object of the present invention can be achieved by a translation machine capable of analyzing a syntax of a sentence described in a source language, converting the syntax in the source language into a syntax in a target language so that a translated sentence is generated in accordance with the syntax in the target language includes a unit for storing an information of predetermine rules of a non-translation, a unit connected to the storing unit for controlling a translation of the sentence described in the source language so that a part of the sentence structured on a predetermined grammar rule is inhibited to be translated, and a unit connected to the controlling unit for outputting the part of the sentence which is inhibited of the translation.

Preferably, the information of the predetermined rules of the non-translation includes a non-translating mode flag for indicating whether or not the non-translation process is done for a specific portion of the input sentence and for predetermined non-translation levels which are respectively corresponding to each of the phrase structure.

More preferably, the grammar rules have corresponding programs so that each of the programs is started at a time when a corresponding grammar rule is applied to the portion of the sentence.

Further preferably, the grammar rules include a sentence consisting of a noun phrase and verb phrase, a noun phrase consisting of an article and a noun phrase, a noun phrase consisting of an article and a noun.

The grammar rules further include a verb phrase consisting of a verb and a noun phrase, a noun phrase consisting of two nouns, and a noun phrase consisting of three nouns, preferably.

The translation module is capable of providing a word buffer for storing each word of the input sentence, a part of the speech for each word, a translated equivalent of the part of the speech, and a nonconverting flag for the each word.

Furthermore preferably, the source language is English and the target language is Japanese.

The controlling unit includes a CPU for controlling the translation process, a memory for storing various kinds of programs used for the translation, preferably.

Preferably, the storing unit is a memory for storing dictionaries, grammar rules and tree structure converting rules.

Further preferably, the memory is a buffer memory.

In operation, the translation machine is enable to output the specific portion of the input sentence structured on the predetermined grammar rule as its translated equivalent. Further, the translation machine is enable to indicate whether or not the non-translating process is used and to specify the syntax structure not to be translated, thereby allowing the final translated sentence to be easily read according to the operator's will.

DESCRIPTION OF PREFERRED EMBODIMENTS

An embodiment of the present invention will be described in detail with reference to the accompanying drawings.

Figure 1:
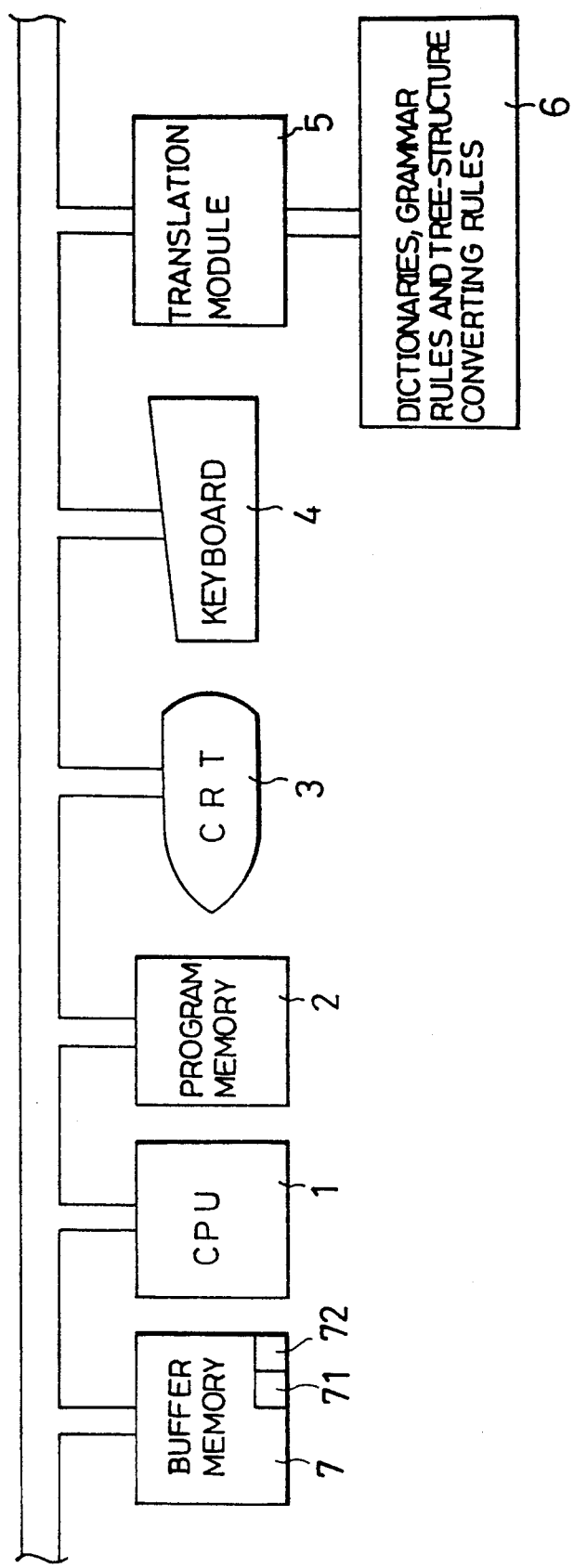
FIG. 1 is a block diagram showing arrangement of a translation machine according to the present invention.

FIG. 1 is a block diagram showing arrangement of a translation machine according to an embodiment of the present invention. As shown, the translation machine includes a central processing unit (CPU) 1 for controlling the translation, a program memory 2 for storing various programs, a buffer memory 7 for storing an input or an output sentence (the buffer memory functioned as register memories as well), a CRT 3 for displaying an input sentence and its translated equivalent, a keyboard 4 from which an operator can input the input sentence or give specific indications, and a translation module 5 for executing translation from the input sentence described in the source language into the output sentence described in the target language. The translation module 5 is connected to a memory 6 which is used for storing dictionaries and various rules including grammar rules.

Those component units are connected to one another through a common bus 8 consisting of a data bus, an address bus and a control bus.

Figure 2:
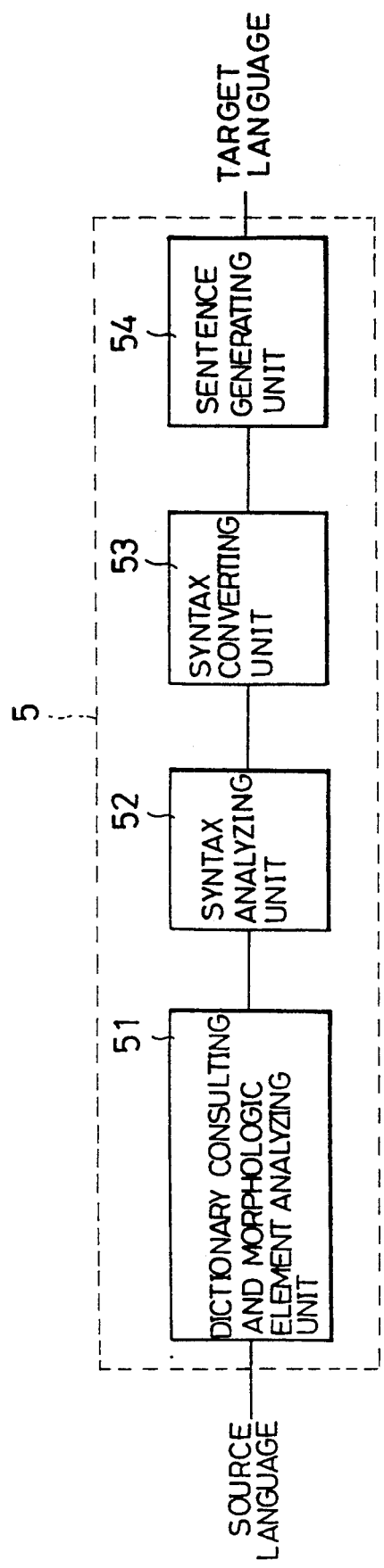
FIG. 2 is a block diagram showing a translation module included in the translation machine shown in FIG. 1.

FIG. 2 shows the arrangement of the translation module 5. The translation module 5 includes a dictionary consulting and morphologic element analyzing unit 51 (for short, word analyzing unit), a syntax analyzing unit 52, a syntax converting unit 53, and a sentence generating unit 54.

The word analyzing unit 51 serves to divide an input sentence into morphologic element series (words) and analyze each element for obtaining the information such as its time, person and numeral by referring the dictionaries and grammar rules stored in the memory 6.

The syntax analyzing unit 52 serves to define a relation of the divided words, that is, a structure-analyzing tree which will be discussed later.

The syntax converting unit 53 serves to convert the syntax in the source language obtained in the syntax analyzing unit 52 into a syntax in the target-language.

The sentence generating unit 54 serves to generate a translated equivalent according to the sentence syntax obtained in the syntax converting unit 53.

Table 1 is a table showing part of grammar rules 30 used for analyzing the input sentence and programs matching to those grammar rules. Those grammar rules are stored in the memory 6.

In Table 1, the grammar rule (a) indicates that a sentence consists of a noun phrase and a verb phrase, the grammar rule (b) indicates that a noun phrase consists of an article and a noun phrase 1, the grammar rule (c) indicates that a noun phrase consists of an article and a noun, the grammar rule (d) indicates that a verb phrase consists of a verb and a noun phrase, the grammar rule (e) indicates that a noun phrase 1 consists of two noun, and the grammar rule (f) indicates that a noun phrase 1 consists of three nouns. Those grammar rules respectively match to the programs (a) to (f).

Figure 3:
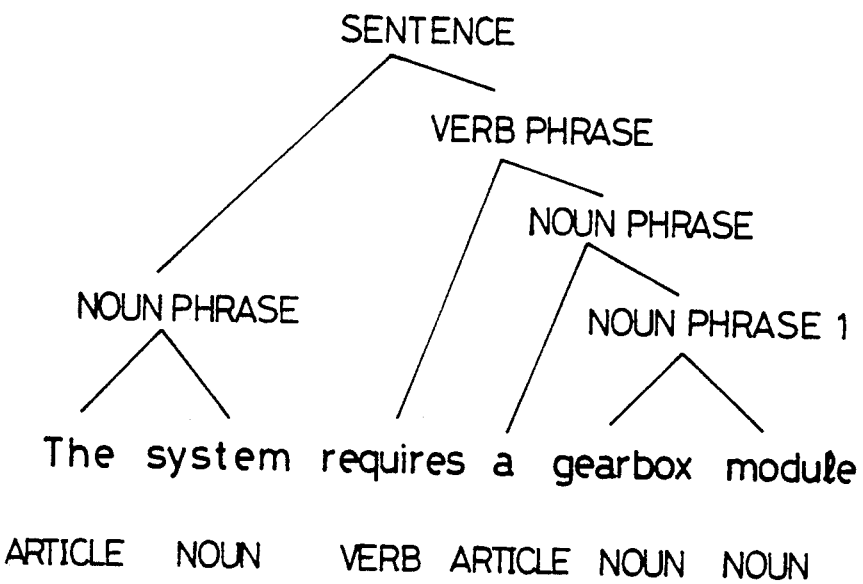
FIG. 3 is a view showing a process of analyzing a syntax in a tree-structure manner.
Figure 4:
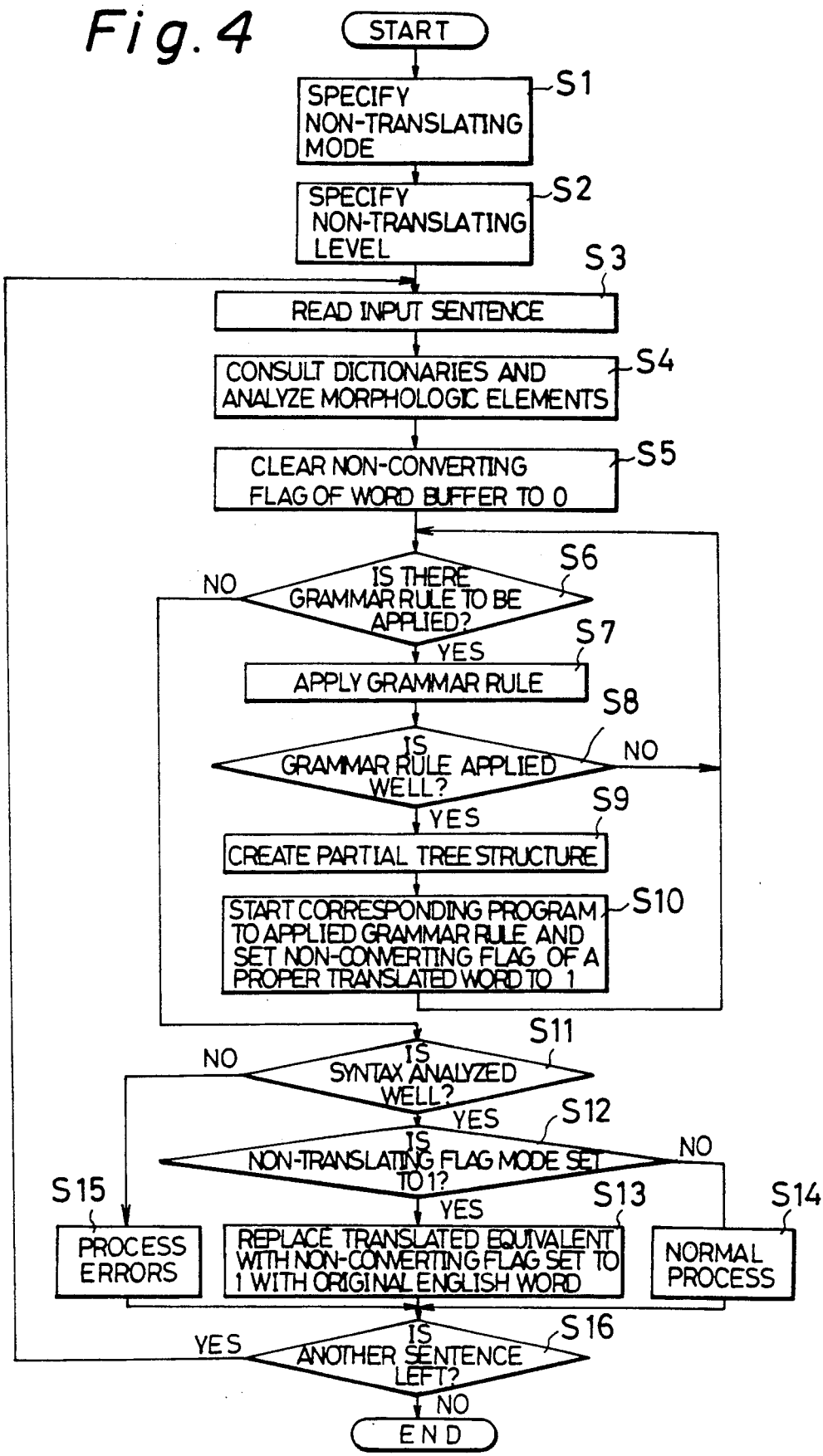
FIG. 4 is a flowchart showing a translation control process of a specific portion of an input sentence when the final translated sentence is output.

Next, the description will be directed to a translation process of the translation machine with reference to Tables 1, 2 and FIGS. 3, 4, in which FIG. 4 is a flowchart showing a process of the translation in this embodiment.

It is assumed that the input sentence is "The system requires a gearbox module".

At a step S1 shown in FIG. 4, an operator inputs an indication about whether or not a non-translating process is to be done (the translation is to be done in a non-translating mode) from function keys provided on the keyboard 4. For determining the indication, the operator uses the Table 1. The information about the indication is stored in a non-translating flag 71 included in the buffer memory 7. For the non-translating mode, a value of 1 is stored. For the other mode, a value of 0 is stored.

At a step S2, the operator inputs one of predetermined non-translating levels from the function key. For the level 1, a noun phrase consisting of three or more consecutive nouns is not translated. For the level 2, a noun phrase consisting of two or more consecutive nouns and for the level 3, a noun phrase consisting of two or more consecutive nouns and an adjective and one or more consecutive nouns are not allowed.

The non-translating level specified by the operator is stored as the corresponding value of 1, 2 or 3 in a non-translating level buffer 72 (not shown) included in the buffer memory 7.

At a step S3, the input sentence is read in a predetermined area contained in the buffer memory 7 under the control of an input program stored in the program memory 2.

At a step S4, the word analyzing unit 51 serves to analyze the input sentence by referring the dictionaries stored in the memory 6. Then, the information obtained from the dictionaries is provided to a word buffer including a part of speech, a translated equivalent, and a non-converting flag for an English word as shown in Table 2.

At a step S5, the non-converting flag 44 included in the word buffer 40 is initialized to 0.

At a step S6, the syntax analyzing unit 52 serves to analyze the syntax of the input sentence based on the grammar rules shown in Table 1. At a step S7, it is checked which grammar rule is applied to the input sentence. If the proper rule exists in the Table 1, it is applied. Then, at a step S8, it is checked if the grammar rule functions well. If not, the process returns to the step S6 at which it is checked if another grammar rule can be applied to the input sentence. If yes, at a step S9, a partial-tree structure of the input sentence is created.

For example, for "The system" of the input sentence, the grammar rule (c) noun phrase consisting of an article and a noun is applied so that "The system" can be recognized as a noun phrase. For "a gearbox module", the grammar rule (e) noun phrase 1 consisting of two nouns and the grammar rule (b) noun phrase consisting of an article and a noun phrase 1 are applied so that "a gear box" can be recognized as a noun phrase.

At a step S10, the suitable program gets started. The program corresponds to the grammar rule obtained at the step S9.

If the grammar rule (e) is selected, the corresponding program (e) is started. The program (e) checks for a non-translating level value stored in the non-translating level buffer 72. If the translating-level value is 2 (meaning that the non-translating process is done for a noun phrase consisting of two or more consecutive nouns) or 3 (meaning that the non-translating process is done for a noun phrase consisting of an adjective and one or more consecutive nouns), the non-converting flag is set to 1 for the two nouns located at the right side of the grammar rule (e). It means that the non-converting flag of the word buffer is set to 1 for two nouns "gearbox" and "module" shown in Table 2. If the non-translating level is 1 (meaning that the non-translating process is done for a noun phrase consisting of three or more consecutive nouns), the program (e) does not set the non-translating flag to 1.

The process from the steps S6 to S10 is repeated until no suitable grammar rule is left.

When no suitable grammar rule is left, at a step S11, it is checked if the syntax is analyzed well. The checking standard is based on whether or not the overall sentence shown in FIG. 3 is tree-structured.

Upon completion of the syntax analysis, the analyzed result shown in FIG. 3 is obtained. it results in the non-converting flag of the word buffer being set as shown in Table 2.

If the syntax is not analyzed well, the process goes to a step S16 through a step S15.

If the syntax is analyzed well at the step S11, the sentence generating unit 54 (see FIG. 2) starts to generate the translated words.

Herein, a process of generating the translated word will be discussed. At first, at the step S12, it is checked if the initialized flag at the non-translating mode has a value of 1 or 0. If it has 1, the process goes to a step S13 and if it has 0, goes to a step S14.

At the step S14, the normal generating process is started whatever value the non-converting flag may take. it results in generating " システムはギアボックス構成要素を必要とする。" (which is a Japanese equivalent of "The system requires a gearbox module" provided if "gearbox" and "module" are respectively translated. Then, the process goes to a step S16).

At the step S13, it is checked if the non-converting flag stored in the word buffer has a value of 1 or 0. If it has 1, the English words are output as their Japanese equivalents. That is, since the non-converting flag to "gearbox" and "module" is set to 1, the English sentence is translated into " システムは gearbox module を必要とする。" Then, the process goes to the step S16.

At the step S16, it is checked if another input sentence is left. If yes, the process returns to the step S3 and if not, the process is terminated.

It is apparent from the above description that when a predetermined grammar rule is applied to the syntax analysis of an input sentence, the corresponding program to the predetermined grammar rule works to set the non-converting flag for each word by referring the non-converting level buffer, thereby allowing a specific portion of the input sentence to be straight output as its translated equivalent without being translated.

Further, this embodiment allows an operator to initialize the non-translating mode flag. Hence, if the operator intends to output a specific portion of the input sentence straightforward, the operator can set the non-converting flag for the word(s) to 1. If, on the contrary, the operator does not intend, the operator can set it to 0.

In addition, the embodiment allows an operator to initialize the non-translating level as well. Hence, the operator can pre-define the structure of the input sentence not to be translated.

The present invention is not limited to the translation between English and Japanese, though the foregoing embodiment has employed it.

Many widely different embodiments of the present invention may be constructed without departing from the spirit and scope of the present invention. It should be understood that the present invention is not limited to the specific embodiments described in this specification, except as defined in the appended claims.

TABLE 1

| Grammar Rules | Corresponding Program |
|---|---|
| (a) Sentence → Noun Phrase + Verb Phrase | (a) |
| (b) Noun Phrase → Article + Noun Phrase 1 | (b) |
| (c) Noun Phrase → Article + Noun Phrase | (c) |
| (d) Verb Phrase → Verb + Noun Phrase | (d) |
| (e) Noun Phrase → Noun + Noun | (e) |
| (f) Noun Phrase 1 → Noun + Noun + Noun | (f) |
| . . | . |
| . . | . |

TABLE 2

| English Word | Part of Speech | Translated Equivalent | Non-converting Flag |
|---|---|---|---|
| The | Article | | 0 |
| System | Noun | | 0 |
| requires | Verb | | 0 |
| a | Article | | 0 |
| gearbox | Noun | | 1 |
| module | Noun | | 1 |

What is claimed is:

1. A translation machine capable of analyzing a syntax of a sentence described in a source language, converting said syntax in said source language into a syntax in a target language so that a translated sentence is generated in accordance with said syntax in said target language, said translation machine comprising:
   storing means for storing information of predetermined rules of non-translation;
   controlling means connected to said storing means for controlling a translation of said sentence described in said source language, said controlling means having a non-translation means for inhibiting a translation of a part of said sentence having a structure corresponding to one of said predetermined rules; and
   output means connected to said controlling means for outputting said part of said sentence inhibited to be translated,
   said information of said predetermined rules of non-translation including a non-translating mode flag for indicating whether said non-translation means is executed for a specific portion of said sentence described in said source language and for predetermined non-translation levels respectively corresponding to sentence phrase structures.

2. A translation machine according to claim 1, wherein said predetermined rules of non-translation include programs activated when a corresponding rule is applied to said specific portion of said sentence.

3. A translation machine according to claim 1, wherein said grammar rules include a sentence consisting of a noun phrase and a verb phrase, a noun phrase consisting of an article and a noun phrase, a noun phrase consisting of an article and a noun.

4. A translation machine according to claim 3, herein said grammar rules further include a verb phrase consisting of a verb and a noun phrase, a noun phrase consisting of two nouns, and a noun phrase consisting of three nouns.

5. A translation machine according to claim I, wherein translation module is capable of providing a word buffer for storing each word of said input sentence, a part of said speech for each word, a translated equivalent of said part of said speech, and a non converting flag for said each word.

6. A translation machine according to claim 1, wherein said source language is English and said target language is Japanese.

7. A translation machine according to claim 1, wherein said controlling means includes
   a central processing unit for controlling a translation process, and
   a memory for storing various kinds of programs used for said translation.

8. A translation machine according to claim 1, wherein said storing means is a memory for storing dictionaries, grammar rules and tree structure converting rules.

9. A translation machine according to claim 8, wherein said memory is a buffer memory.

* * * * *